United States Patent Office.

FRANKLIN RUDOLPH, OF CHICAGO, ILLINOIS.

PROCESS OF ORNAMENTING SURFACES.

SPECIFICATION forming part of Letters Patent No. 333,259, dated December 29, 1885.

Application filed June 22, 1885. Serial No. 169,487. (Specimens.)

*To all whom it may concern:*

Be it known that I, FRANKLIN RUDOLPH, a citizen of the United States, residing at Chicago, in the county of Cook and State of Illinois, have invented a new and useful Process of Ornamenting Metal Surfaces; and I hereby declare the following to be a full, clear, and exact description of the same.

My invention relates particularly to the ornamentation of sheet-metal surfaces, which operation is known to the trade as "lacquering," "varnishing," or "japanning," whereby they are mottled in attractive designs, and are thus rendered desirable for the various purposes to which sheet metal thus prepared is adapted, among others to form covering for trunks, and for stove-boards, these being the particular objects in connection with which I desire to use metal subjected to the treatment involved in my new process.

The process referred to consists, essentially, in the three steps of applying to the surface to be ornamented a liquid—such as turpentine—containing a gummy substance in solution, evaporating the liquid, whereby the gummy substance is reduced to a desired consistence and is deposited upon and adheres to the surface, and rubbing upon the gummy substance dry coloring-matter. The foregoing steps do not, however, necessarily constitute the only ones included in my process, but form those which are essential, and to which may be added others, as hereinafter set forth and claimed.

To prepare the surface it may first be provided with a coat of paint or other coloring-matter, to afford a background. When this shall have been properly dried, I sprinkle or apply with a sponge upon it preferably spirits of turpentine, though other liquid containing a gummy substance in solution may be used. If desired, coloring-matter or bronze may be mixed with the turpentine or other liquid before its application, whereby an additional color is provided to the surface without extra labor, as will be more clearly understood from the description hereinafter contained. The coating thus applied is then subjected to a drying influence, either artificial or natural, depending upon whether or not it is desired to save time in the operation. This has the effect of evaporating the liquid constituent of the substance applied, leaving the coloring-matter, if employed, deposited in spots upon the surface, and the gummy constituent deposited in a clear condition in irregular forms around the spots. The same action of the gum is attained even if coloring-matter is omitted from the applied liquid—that is to say, it becomes deposited upon and adheres to the surface, forming empirical irregular embellishments. I prefer, however, to add the coloring-matter for the reason hereinbefore stated. If desired, any gummy substance may be added to the turpentine, if the latter is used, to increase the proportion to the liquid of the gummy constituent. The drying of this coat is continued until it shall have rendered the gummy substance of a consistence known to the trade by the term "tacky," which conveys the idea that it shall not have been allowed to become hard, when any desired color in the form of fine dry particles—such as powder or flake—is rubbed with a chamois-skin over the surface and adheres to the gum outlines. When the gum, with the coloring-matter thus applied, has become hard by drying, the surface is washed or rubbed to remove any of the coloring-matter last applied that may have adhered to the surface between the outlines formed by the gum, whereby the coloring-matter mixed with the turpentine or the like, or, if none were so mixed, the background afforded by the surface is presented to view. To fix with increased firmness the embellishments thus produced, and further enhance the appearance of the surface, the latter may be coated with varnish.

What I claim as new, and desire to secure by Letters Patent, is—

1. The herein-described process of ornamenting a metallic surface, which consists in applying to it a liquid, such as turpentine, in which a gummy substance is dissolved, evaporating the liquid until the gummy substance becomes reduced to a desired consistence, and rubbing dry coloring-matter upon the parts of the surface on which the gummy substance deposits, substantially as described.

2. The herein-described process of ornamenting a metallic surface, which consists in applying to it a liquid, such as turpentine, in which a gummy substance is dissolved, and containing coloring-matter in solution, evaporating the liquid until the gummy substance becomes reduced to a desired consistence and the coloring-matter deposited in spots, and rubbing additional dry coloring-matter upon the gummy substance, substantially as described.

3. The herein-described process of ornamenting a metallic surface, which consists in applying to it a liquid, such as turpentine, in which a gummy substance is dissolved, evaporating the liquid until the gummy substance becomes reduced to a desired consistence, rubbing dry coloring-matter upon the surface and removing therefrom superfluous coloring-matter, substantially as described.

4. The herein-described process of ornamenting a metallic surface, which consists in applying to it a liquid, such as turpentine, in which a gummy substance is dissolved, and containing coloring-matter in solution, evaporating the liquid until the gummy substance becomes reduced to a desired consistence and the coloring-matter deposited in spots, rubbing additional dry coloring-matter upon the surface, and removing therefrom superfluous dry coloring-matter, substantially as described.

5. The herein-described process of ornamenting a metallic surface, which consists in applying to it a coloring-matter to form a background, applying upon the background a liquid, such as turpentine, in which a gummy substance is dissolved, evaporating the liquid until the gummy substance becomes reduced to a desired consistence, rubbing additional dry coloring-matter upon the surface, and removing therefrom superfluous dry coloring-matter, substantially as described.

6. The herein-described process of ornamenting a metallic surface, which consists in applying to it a liquid, such as turpentine, in which a gummy substance is dissolved, evaporating the liquid until the gummy substance becomes reduced to a desired consistence, rubbing dry coloring-matter upon the gummy substance, and varnishing the surface so treated, substantially as described.

7. The herein-described process of ornamenting a metallic surface, which consists in applying to it a coloring-matter to form a background, applying upon the background a liquid, such as turpentine, in which a gummy substance is dissolved and containing coloring-matter in solution, evaporating the liquid until the gummy substance becomes reduced to a desired consistence and the said coloring-matter deposited in spots, rubbing additional dry coloring-matter upon the surface, removing therefrom superfluous dry coloring-matter, and varnishing the surface thus treated, substantially as described.

FRANKLIN RUDOLPH.

In presence of—
MASON BROSS,
EDWARD THORPE.